US011881164B2

(12) United States Patent
Xu

(10) Patent No.: US 11,881,164 B2
(45) Date of Patent: Jan. 23, 2024

(54) PIXEL CIRCUIT AND DRIVING METHOD THEREOF, AND DISPLAY PANEL

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventor: Yingsong Xu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 298 days.

(21) Appl. No.: 16/492,682

(22) PCT Filed: Apr. 1, 2019

(86) PCT No.: PCT/CN2019/080831
§ 371 (c)(1),
(2) Date: Sep. 10, 2019

(87) PCT Pub. No.: WO2019/205898
PCT Pub. Date: Oct. 31, 2019

(65) Prior Publication Data

US 2021/0327347 A1 Oct. 21, 2021

(30) Foreign Application Priority Data

Apr. 26, 2018 (CN) ........................ 201810388273.6

(51) Int. Cl.
*G09G 3/3233* (2016.01)
*G09G 3/20* (2006.01)
(Continued)

(52) U.S. Cl.
CPC ......... *G09G 3/3233* (2013.01); *G09G 3/2092* (2013.01); *G09G 3/3266* (2013.01);
(Continued)

(58) Field of Classification Search
CPC .. G09G 3/3233; G09G 3/2092; G09G 3/3266; G09G 3/329; G09G 2300/0426; G09G 2310/061
See application file for complete search history.

(56) References Cited

U.S. PATENT DOCUMENTS

| | | | |
|---|---|---|---|
| 10,121,416 B2 | 11/2018 | Cai et al. | |
| 10,332,451 B2 | 6/2019 | Cai et al. | |

(Continued)

FOREIGN PATENT DOCUMENTS

| | | | |
|---|---|---|---|
| CN | 102005182 A | 4/2011 | |
| CN | 104898887 A * | 9/2015 | ........... G09G 3/3233 |

(Continued)

OTHER PUBLICATIONS

First Chinese Office Action dated Jul. 29, 2019.

*Primary Examiner* — Benjamin C Lee
*Assistant Examiner* — Nathan P Brittingham
(74) *Attorney, Agent, or Firm* — Dilworth & Barrese, LLP.; Michael J. Musella, Esq.

(57) ABSTRACT

A pixel circuit and a driving method thereof, and a display panel are provided. The pixel circuit included a data writing circuit, a driving circuit, and a compensation circuit. The data writing circuit is configured to write a data signal to the control terminal of the driving circuit in response to a scan signal; and the compensation circuit is connected with the control terminal of the driving circuit, the first terminal of the driving circuit, the second terminal of the driving circuit and a first voltage terminal, and is configured to store a data signal written by the data writing circuit, to compensate the driving circuit, and to adjust, by coupling, a voltage of the second terminal of the driving circuit.

16 Claims, 7 Drawing Sheets

(51) Int. Cl.
*G09G 3/3266* (2016.01)
*G09G 3/3291* (2016.01)

(52) U.S. Cl.
CPC ... *G09G 3/3291* (2013.01); *G09G 2300/0426* (2013.01); *G09G 2310/061* (2013.01)

(56) References Cited

U.S. PATENT DOCUMENTS

| | | | | |
|---|---|---|---|---|
| 2004/0220994 | A1* | 11/2004 | Mathew | G06F 7/506 708/670 |
| 2015/0220201 | A1* | 8/2015 | Wu | G06F 3/04166 345/173 |
| 2016/0035277 | A1 | 2/2016 | Han et al. | |
| 2016/0171930 | A1 | 6/2016 | Song et al. | |
| 2017/0147121 | A1* | 5/2017 | Yang | H01L 27/3246 |
| 2018/0047336 | A1 | 2/2018 | Chen et al. | |
| 2021/0201776 | A1* | 7/2021 | Yuan | G09G 3/3233 |

FOREIGN PATENT DOCUMENTS

| | | | |
|---|---|---|---|
| CN | 105321472 | A | 2/2016 |
| CN | 106205494 | A | 12/2016 |
| CN | 106205495 | A | 12/2016 |
| CN | 107731161 | A | 2/2018 |
| CN | 108597450 | A | 9/2018 |
| KR | 20170132598 | A | 12/2017 |

* cited by examiner

PIXEL CIRCUIT AND DRIVING METHOD THEREOF, AND DISPLAY PANEL

This present application claims priority to Chinese patent application No. 201810388273.6 filed on Apr. 26, 2018, which is hereby entirely incorporated by reference as a part of the present application.

TECHNICAL FIELD

Embodiments of the present disclosure relate to a pixel circuit, a driving method of the pixel circuit and a display panel.

BACKGROUND

An organic light emitting diode (OLED) display device is gradually attracting attention of people because of advantages such as wide view angle, high contrast, rapid response and higher luminance and lower driving voltage compared to an inorganic light emitting display device. Due to the above characteristics, the organic light emitting diode can be applied in a device having a display function such as a cellphone, a display, a notebook, a digital camera, instrument and apparatus and the like.

A pixel circuit of the OLED display device usually adopts a matrix driving manner, and the matrix driving manner is categorized as an active matrix (AM) driving and a passive matrix (PM) driving according to whether a switch element is in each pixel unit. PMOLED is of simple process and low cost, but cannot satisfy requirements of high-resolution and large-size display due to disadvantages such as crosstalk, high consumption and short lifetime. In contrast, AMOLED integrates a set of thin film transistor and storage capacitor in the pixel circuit of each pixel, and realizes an control over a current running through the OLED by controlling a driving of the thin film transistor and the storage capacitor, so as to enable the OLED to emit light according to needs. Compared to PMOLED, AMOLED needs a smaller driving current and has lower consumption and a longer lifetime, so as to be able to satisfy requirements of high-resolution, multiple-grayscale and large-size display. Meanwhile, AMOLED has obvious advantages in respects such as visible angle, color rendition, consumption and response time, and is applicable in a high-information content and high-resolution display device.

SUMMARY

At least one embodiment of the present disclosure provides a pixel circuit including a data writing circuit, a driving circuit, a compensation circuit and a light emitting element. The driving circuit includes a control terminal, a first terminal and a second terminal, and the driving circuit is configured to control a driving current, which flows through the first terminal and the second terminal and is used to drive the light emitting element to emit light; the data writing circuit is connected with the control terminal of the driving circuit, and is configured to write a data signal to the control terminal of the driving circuit in response to a scan signal; the compensation circuit is connected with the control terminal of the driving circuit, the first terminal of the driving circuit, the second terminal of the driving circuit and a first voltage terminal, and the compensation circuit is configured to store the data signal written by the data writing circuit, to compensate the driving circuit, and to adjust, by coupling, a voltage of the second terminal of the driving circuit; and the light emitting element includes a first terminal and a second terminal, the first terminal of the light emitting element is configured to receive the driving current, and the second terminal of the light emitting element is connected with a second voltage terminal.

For example, in the pixel circuit provided by an embodiment of the present disclosure, the compensation circuit includes a first compensation sub-circuit and a second compensation sub-circuit. The first compensation sub-circuit is connected with the control terminal of the driving circuit and the second terminal of the driving circuit, and the first compensation sub-circuit is configured to store the data signal written by the data writing circuit and to compensate the driving circuit; and the second compensation sub-circuit is connected with the first voltage terminal, the first terminal of the driving circuit and the second terminal of the driving circuit, and the second compensation sub-circuit is configured to adjust, by coupling, the voltage of the second terminal of the driving circuit according to a voltage variation value at the control terminal of the driving circuit.

For example, in the pixel circuit provided by an embodiment of the present disclosure, the first compensation sub-circuit is further configured to adjust, by coupling, a voltage of the control terminal of the driving circuit according to a voltage variation value at the second terminal of the driving circuit.

For example, in the pixel circuit provided by an embodiment of the present disclosure, the first compensation sub-circuit includes a first storage capacitor. A first electrode of the first storage capacitor is connected with the control terminal of the driving circuit, and a second electrode of the first storage capacitor is connected with the second terminal of the driving circuit.

For example, in the pixel circuit provided by an embodiment of the present disclosure, the second compensation sub-circuit includes a second storage capacitor. A first electrode of the second storage capacitor is connected with the first voltage terminal and the first terminal of the driving circuit, and a second electrode of the second storage capacitor is connected with the second terminal of the driving circuit.

For example, the pixel circuit provided by an embodiment of the present disclosure further includes a light emission control circuit. The light emission control circuit is connected with the second terminal of the driving circuit and the first terminal of the light emitting element, and the light emission control circuit is configured to apply the driving current to the light emitting element in response to a light emission control signal.

For example, the pixel circuit provided by an embodiment of the present disclosure further includes a reset circuit. The reset circuit is connected with a reset voltage terminal and the first terminal of the light emitting element, and the reset circuit is configured to apply a reset voltage to the first terminal of the light emitting element in response to a reset signal; the reset signal is synchronized with the scan signal.

For example, in the pixel circuit provided by an embodiment of the present disclosure, the driving circuit includes a first transistor. A gate electrode of the first transistor functions as the control terminal of the driving circuit, a first electrode of the first transistor functions as the first terminal of the driving circuit and is configured to be connected with the first voltage terminal to receive a first voltage, and a second electrode of the first transistor functions as the second terminal of the driving circuit.

For example, in the pixel circuit provided by an embodiment of the present disclosure, the data writing circuit includes a second transistor. A gate electrode of the second transistor is configured to be connected with a scan line to receive the scan signal, a first electrode of the second transistor is configured to be connected with a data line to receive the data signal, and the second electrode of the second transistor is configured to be connected with the control terminal of the driving circuit.

For example, in the pixel circuit provided by an embodiment of the present disclosure, the light emission control circuit includes a third transistor. A gate electrode of the third transistor is configured to be connected with a light emission control line to receive the light emission control signal, a first electrode of the third transistor is configured to be connected with the second terminal of the driving circuit, and a second electrode of the third transistor is configured to be connected with the first terminal of the light emitting element.

For example, in the pixel circuit provided by an embodiment of the present disclosure, the reset circuit includes a fourth transistor. A gate electrode of the fourth transistor is configured to be connected with a reset control line to receive the reset signal, a first electrode of the fourth transistor is configured to be connected with the reset voltage terminal to receive the reset voltage, and a second electrode of the fourth transistor is configured to be connected with the first terminal of the light emitting element.

For example, in the pixel circuit provided by an embodiment of the present disclosure, the reset circuit includes a fourth transistor. A gate electrode of the fourth transistor is configured to be connected with a scan line to receive the scan signal which functions as the reset signal, a first electrode of the fourth transistor is configured to be connected with the reset voltage terminal to receive the reset voltage, and a second electrode of the fourth transistor is configured to be connected with the first terminal of the light emitting element.

At least one embodiment of the present disclosure further provides a display panel including a plurality of pixel units arranged in an array. Each of the plurality of pixel units includes the pixel circuit as provided in any one of the embodiments of the present disclosure.

For example, the display panel according to an embodiment of the present disclosure further includes a plurality of scan lines, a scan line of the plurality of scan lines is correspondingly connected with data writing circuits of pixel circuits in a row of pixel units to provide the scan signal.

For example, in the display panel according to an embodiment of the present disclosure, in a case where the pixel circuit includes a reset circuit, a scan line of the plurality of scan lines is further correspondingly connected with reset circuits of the pixel circuits in the row of pixel units to provide the scan signal, and the scan signal functions as the reset signal.

At least one embodiment of the present disclosure also provides a driving method of a pixel circuit, the driving method is used for the pixel circuit provided by any one of the embodiments of the present disclosure, and the driving method includes a compensation phase and a data writing phase. During the compensation phase, the scan signal is inputted, the data writing circuit and the driving circuit are turned on, and the compensation circuit compensates the driving circuit; and during the data writing phase, the scan signal and the data signal are inputted, the data writing circuit is turned on, the data writing circuit writes the data signal to the compensation circuit, and the compensation circuit adjusts, by coupling, the voltage of the second terminal of the driving circuit according to a voltage variation value at the control terminal of the driving circuit.

At least one embodiment of the present disclosure further provides the driving method of the pixel circuit, which is used in the pixel circuit provided by any one of the embodiments of the present disclosure. In a case where the compensation circuit includes a first compensation sub-circuit and a second compensation sub-circuit, the driving method includes a compensation phase and a data writing phase; during the compensation phase, the scan signal is inputted, the data writing circuit and the driving circuit are turned on, and the first compensation sub-circuit compensates the driving circuit; and during the data writing phase, the scan signal and the data signal are inputted, the data writing circuit is turned on, the data writing circuit writes the data signal to the first compensation sub-circuit, and the second compensation sub-circuit adjusts, by coupling, the voltage of the second terminal of the driving circuit according to a voltage variation value at the control terminal of the driving circuit.

For example, in the driving method provided by an embodiment of the present disclosure, in a case where the pixel circuit includes a light emission control circuit, the driving method further includes a light emission phase. During the light emission phase, a light emission control signal is inputted, the light emission control circuit and the driving circuit are turned on, the first compensation sub-circuit adjusts, by coupling, the voltage of the control terminal of the driving circuit according to a voltage variation value at the second terminal of the driving circuit, and the light emission control circuit applies the driving current to the light emitting element to cause the light emitting element to emit light.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
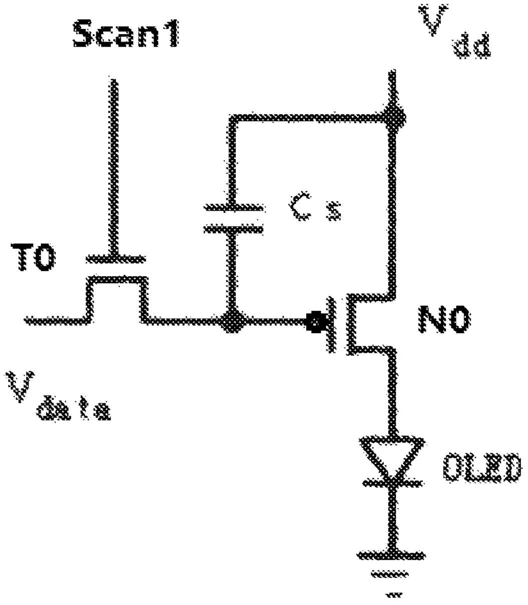
FIG. 1A is a schematic diagram of a 2T1C pixel circuit.
Figure 1B:
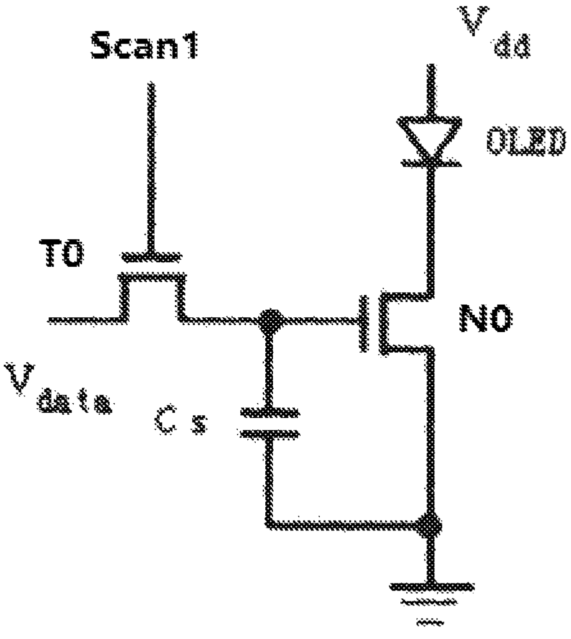
FIG. 1B is a schematic diagram of another 2T1C pixel circuit.

A basic pixel circuit used in an AMOLED display device is usually a 2T1C pixel circuit, that is, a basic function of driving an OLED to emit light is realized by using two TFTs (thin-film transistors) and one storage capacitor Cs. FIG. 1A and FIG. 1B are schematic diagrams showing two types of 2T1C pixel circuits, respectively.

As illustrated in FIG. 1A, a type of 2T1C pixel circuit includes a switch transistor T0, a driving transistor NO and a storage capacitor Cs. For example, a gate electrode of the switch transistor T0 is connected with a gate line to receive a scan signal Scan1, for example, a source electrode of the switch transistor T0 is connected with a data line to receive a data signal Vdata, and a drain electrode of the switch transistor T0 is connected with a gate electrode of the driving transistor NO. A source electrode of the driving transistor NO is connected with a first voltage terminal to receive a first voltage Vdd (a high voltage), and a drain electrode of the driving transistor NO is connected with the anode of the OLED. One terminal of the storage capacitor Cs is connected with the drain electrode of the switch transistor T0 and the gate electrode of the driving transistor NO, and the other terminal of the storage capacitor Cs is connected with the source electrode of the driving transistor NO and the first voltage terminal. The cathode of the OLED is connected with a second voltage terminal to receive a second voltage Vss (a low voltage, a grounded voltage for example). A driving manner of the 2T1C pixel circuit is to control bright and dark (a greyscale) of a pixel by the two TFTs and the storage capacitor Cs. When the scan signal Scant is applied by the gate line to turn on the switch transistor T0, the data signal (Vdata) which is inputted through the data line by a data driving circuit charges the storage capacitor Cs through the switch transistor T0, so as to store the data signal in the storage capacitor Cs. The data signal that is stored controls a conduction degree of the driving transistor NO so as to control a value of a current which runs through the driving transistor NO to drive the OLED to emit light; that is, the current determines an emission greyscale of the pixel. In the 2T1C pixel circuit as illustrated in FIG. 1A, the switch transistor T0 is an n-type transistor, and the driving transistor NO is a p-type transistor.

As illustrated in FIG. 1B, another type of 2T1C pixel circuit also includes a switch transistor T0, a driving transistor NO and a storage capacitor Cs, but the connection manner is slightly different, and the driving transistor NO is an n-type transistor. Difference of the pixel circuit of FIG. 1B compared to the pixel circuit of FIG. 1A includes: the anode of the OLED is connected with the first voltage terminal to receive the first voltage Vdd (a high voltage), the cathode of the OLED is connected with the drain electrode of the driving transistor NO, and the source electrode of the driving electrode NO is connected with the second voltage terminal to receive the second voltage Vss (a low voltage, a grounded voltage for example). One terminal of the storage capacitor Cs is connected with the drain electrode of the switch transistor T0 and the gate electrode of the driving transistor NO, and the other terminal of the storage capacitor Cs is connected with the source electrode of the driving transistor NO and the second voltage terminal. The operation manner of the 2T1C pixel circuit is substantially same as the pixel circuit as illustrated in FIG. 1A, which is not repeated here.

Additionally, for the pixel circuits as illustrated in FIG. 1A and FIG. 1B, the switch transistor T0 is not limited to an n-type transistor and may also be a p-type transistor, and a polarity of the scan signal Scant controlling the switch transistor T0 to turn on or turn off is accordingly changed.

An OLED display device usually includes a plurality of pixel units arranged in an array, and each pixel circuit may include the above mentioned pixel circuit for example. In the OLED display device, on the one hand, a threshold voltage of the driving transistor of each pixel circuit may vary due to a manufacturing process, and the threshold voltage of the driving transistor may drift as a variation of working time, a variation of temperature for example. Therefore, difference in threshold voltages of thin film transistors may cause poor display (e.g., display mura), so that the threshold voltage of the thin film transistor needs to be compensated. On the other hand, in a process of outputting and transmitting the first voltage Vdd (for example, a high voltage) from an integrated circuit (IC) to the pixel units, because there is a resistance on the first voltage line, a voltage drop of the first voltage Vdd is caused, and thereby brightness difference of the screen brightness exists between an end near the IC and an end far away from the IC At least one embodiment of the present disclosure provides a pixel circuit. The pixel circuit includes a data writing circuit, a driving circuit, a compensation circuit and a light emitting element. The driving circuit includes a control terminal, a first terminal and a second terminal, and the driving circuit is configured to control a driving current, which flows through the first terminal and the second terminal and is used to drive the light emitting element to emit light; the data writing circuit is connected with the control terminal of the driving circuit, and the data writing circuit is configured to write a data signal to the control terminal of the driving circuit in response to a scan signal; the compensation circuit is connected with the control terminal of the driving circuit, the first terminal of the driving circuit, the second terminal of the driving circuit and a first voltage terminal, and the compensation circuit is configured to store the data signal written by the data writing circuit, to compensate the driving circuit and to adjust, by coupling, a voltage of the second terminal of the driving circuit; and a first terminal of the light emitting element is configured to receive the driving current, and a second terminal of the light emitting element is connected with a second voltage terminal.

At least one embodiment of the present disclosure further provides a driving method corresponding to the above pixel circuit, and a display panel.

The pixel circuit, the driving method of the pixel circuit, and the display panel provided by at least one embodiment of the present disclosure can compensate for the threshold voltage of the driving circuit of the pixel circuit on one hand, thereby avoiding a phenomenon of display mura of the display device. On the other hand, the defect that brightness difference caused by the different voltage drops between the end far away from the integrated circuit and the end near the integrated circuit can be solved, so that the display effect of the display panel adopting the pixel circuit can be improved.

Embodiments and their examples of the present disclosure are described in detail below with reference to the accompanying drawings. It should be noted that the same reference numerals in the different drawings are used to refer to the same elements that have been described.

Figure 2:
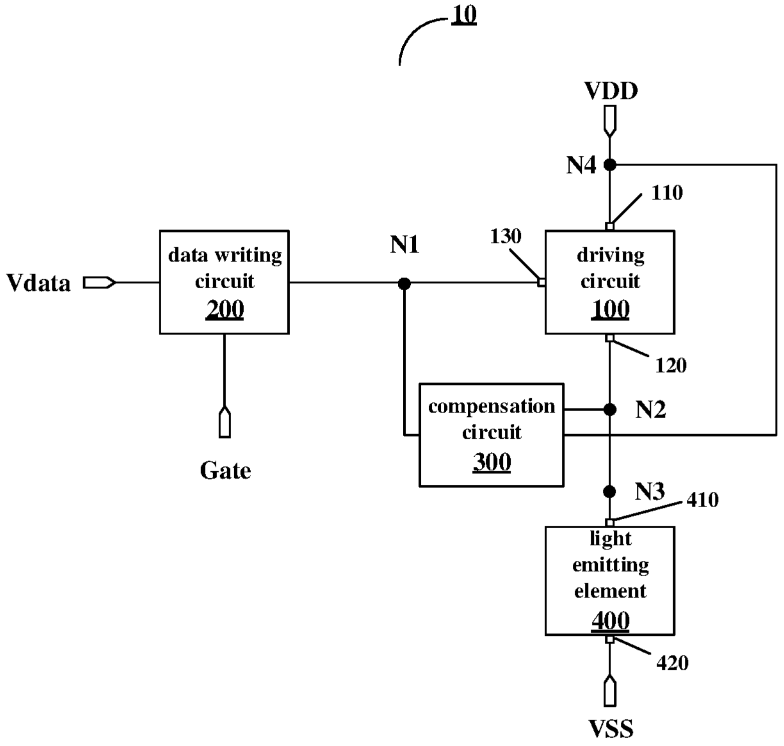
FIG. 2 is a schematic block diagram of a pixel circuit according to an embodiment of the present disclosure.

One example of an embodiment of the present disclosure provides a pixel circuit 10 that is used, for example, for a sub-pixel of an OLED display panel. As shown in FIG. 2, the pixel circuit 10 includes a driving circuit 100, a data writing circuit 200, a compensation circuit 300, and a light emitting element 400.

Figure 3:
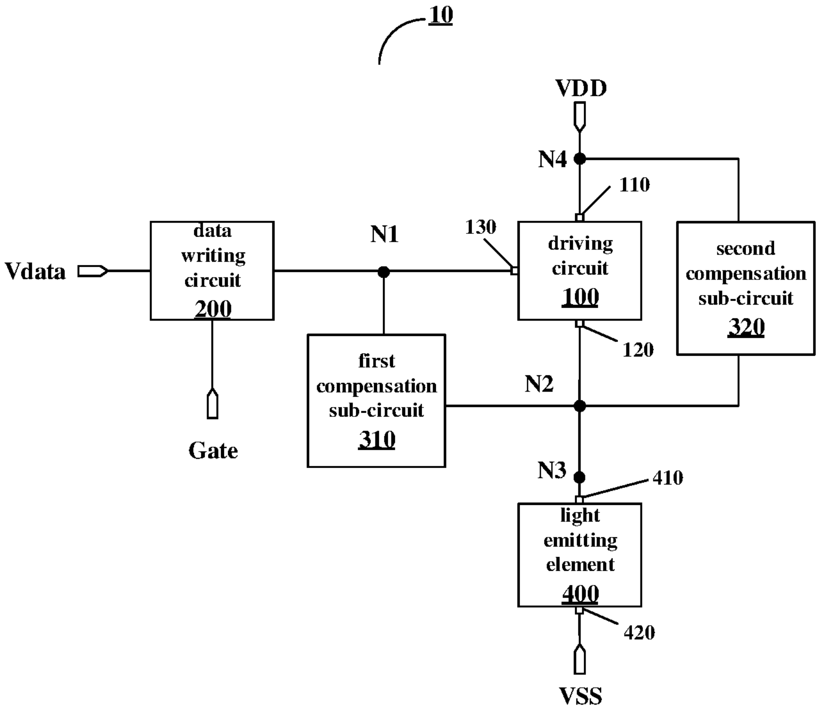
FIG. 3 is a schematic block diagram of another pixel circuit according to an embodiment of the present disclosure.
Figure 4:
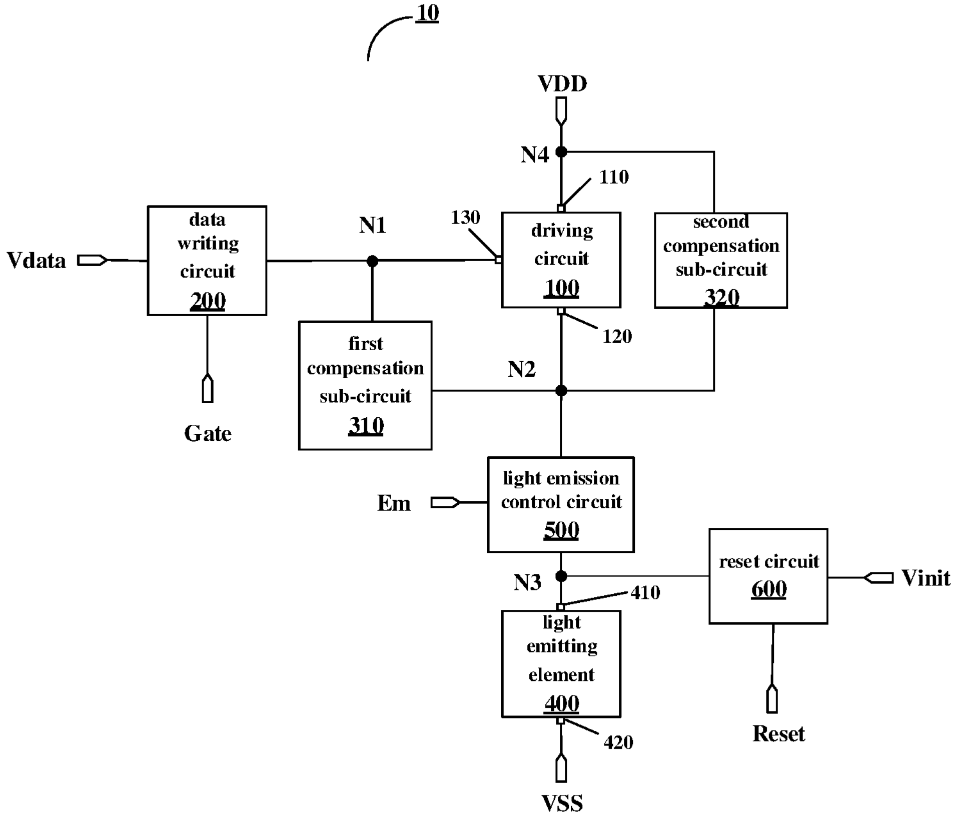
FIG. 4 is a schematic block diagram of still another pixel circuit according to an embodiment of the present disclosure.

For example, the driving circuit 100 includes a first terminal 110, a second terminal 120 and a control terminal 130, and the driving circuit 100 is configured to control a driving current, which flows through the first terminal 110 and the second terminal 120 and is used to drive the light emitting element 400 to emit light. The control terminal 130 of the driving circuit 100 is connected with a first node N1, the first terminal 110 of the driving circuit 100 is connected with a fourth node N4, for example, the fourth node N4 is connected with a first voltage terminal VDD (for example, the first voltage terminal VDD provides a high level), and the second terminal 120 of the driving circuit 100 is connected with a second node N2. For example, during a light emission phase, the driving circuit 100 can provide the driving current to the light emitting element 400 to drive the light emitting element 400 to emit light, and the light emitting element 400 may emit light according to a desired "gray scale". For example, in the examples as shown in FIG. 2 and FIG. 3, the light emitting element 400 may adopt an OLED, and is configured to be connected with the second node N2 and a second voltage terminal VSS (for example, the second voltage terminal VSS provides a low level). For example, in other examples of the present disclosure, as in the example as shown in FIG. 4, in a case where the pixel circuit 10 includes a light emission control circuit 500, the light emitting element 400 may be connected with the second node N2 through the light emission control circuit 500, which is not limited to the present disclosure.

For example, the data writing circuit 200 is connected with the control terminal 130 (the first node N1) of the driving circuit 100, and the data writing circuit 200 is configured to write a data signal to the control terminal 130 (the first node N1) of the driving circuit 100 in response to a scan signal. For example, the data writing circuit 200 is respectively connected with a data line (for example, the data writing circuit 200 is connected with the data line through a data signal terminal Vdata), the first node N1, and a scan line (for example, the data writing circuit 200 is connected with the scan line through a scan signal terminal Gate). For example, the scan signal from the scan signal terminal Gate is applied to the data writing circuit 200 to control whether the data writing circuit 200 is turned on or not. For example, during a data writing phase, the data writing circuit 200 can be turned on in response to the scan signal, so as to write the data signal to the control terminal 130 (the first node N1) of the driving circuit 100, and the data signal is stored in the compensation circuit 300, so that the driving current used to drive the light emitting element 400 to emit light can be generated based on the data signal, for example, during the light emission phase.

For example, the compensation circuit 300 is connected with the control terminal 130 (the first node N1) of the driving circuit, the first terminal 110 (the fourth node N4) of the driving circuit, the second terminal 120 (the second node N2) of the driving circuit and the first voltage terminal VDD (the fourth node N4), and the compensation circuit 300 is configured to store the data signal written by the data writing circuit 200, to compensate the driving circuit 100, and to adjust, by coupling, a voltage of the second terminal 120 (the second node N2) of the driving circuit 100. For example, in a case where the compensation circuit 300 includes a storage capacitor, for example, during a compensation phase, the compensation circuit 300 can store information associated with the threshold voltage of the driving circuit 100 in the storage capacitor. For another example, during the data writing phase, the compensation circuit 300 can store the data signal written by the data writing circuit 200 in the storage capacitor, so as to use the stored voltages including the data signal Vdata and the threshold voltage to control the driving circuit 100 during the light emission phase and to allow the driving circuit 100 to be compensated.

For example, the light emitting element 400 includes a first terminal 410 and a second terminal 420, the first terminal 410 of the light emitting element 400 is configured to receive the driving current from the second terminal 120 of the driving circuit 100, and the second terminal 420 of the light emitting element 400 is connected with the second voltage terminal VSS. For example, the first terminal 410 of the light emitting element 400 is connected with a third node N3. For example, in the example as shown in FIG. 2 or FIG. 3, the third node N3 is connected with the second node N2, so that the first terminal 410 of the light emitting element 400 is connected with the second node N2. For another example, in the example as shown in FIG. 4, in a case where the pixel circuit 10 includes a light emission control circuit 500, the first terminal 410 (the third node N3) of the light emitting element 400 may be connected with the second node N2 through the light emission control circuit 500.

As shown in FIG. 3, on the basis of the example as shown in FIG. 2, for example, the compensation circuit 300 includes a first compensation sub-circuit 310 and a second compensation sub-circuit 320.

The first compensation sub-circuit 310 is connected with the control terminal 130 (the first node N1) of the driving circuit 100 and the second terminal 120 (the second node N2) of the driving circuit 100, and the first compensation sub-circuit 310 is configured to store the data signal written by the data writing circuit 200 and to compensate the driving circuit 100. For example, in a case where the first compensation sub-circuit 310 includes a storage capacitor, for example, during the compensation phase, the first compensation sub-circuit 310 can allow the information associated with the threshold voltage of the driving circuit 100 to be stored in the storage capacitor, correspondingly. For another example, during the data writing phase, the first compensation sub-circuit 310 can store the data signal written by the data writing circuit 200 in the storage capacitor, and thus the stored voltage including the data signal Vdata and the threshold voltage can be utilized in, for example, the light emission phase to control the driving circuit 100, such that the output of the driving circuit 100 can be compensated for.

The second compensation sub-circuit 320 is connected with the first voltage terminal VDD, the first terminal 110 (the fourth node N4) of the driving circuit 100 and the second terminal 120 (the second node N2) of the driving circuit 100, and the second compensation sub-circuit 320 is configured to adjust, by coupling, the voltage of the second terminal 120 (the second node N2) of the driving circuit 100 according to the voltage variation value at the control terminal 130 (the first node N1) of the driving circuit 100. For example, in a case where the second compensation sub-circuit 320 includes a storage capacitor, during the data writing phase and the light emission phase, in a case where the voltage of the control terminal 130 (i.e., the first node N1) of the driving circuit 100 changes, based on characteristics of the storage capacitor itself in the second compensation sub-circuit 320 (for example, the characteristic that a voltage difference between two electrodes of the storage capacitor cannot be suddenly changed), and the second compensation sub-circuit 320 can adjust, by coupling, the voltage of the second terminal 120 (the second node N2) of the driving circuit 100 according to the voltage variation value at the first node N1, so as to adjust the value of the driving current for driving the light emitting element 400 to emit light during the light emission phase.

For example, as shown in FIG. 4, on the basis of the example as shown in FIG. 3, the pixel circuit 10 further includes a light emission control circuit 500 and a reset circuit 600.

The light emission control circuit 500 is connected with the second terminal 120 (i.e., the second node N2) of the driving circuit 100 and the first terminal 410 (i.e., the third node N3) of the light emitting element 400, and the light emission control circuit 500 is configured to apply the driving current to the light emitting element 400 in response to a light emission control signal. For example, the light emission control circuit 500 is respectively connected with a light emission control line (for example, the light emission control circuit 500 is connected with the light emission control line through a light emission control terminal Em), the second terminal 120 (the second node N2) of the driving circuit 100 and the first terminal 410 (namely the third node N3) of the light emitting element 400. For example, during a reset phase, the light emission control circuit 500 may be turned on in response to the light emission control signal, and thus a reset voltage provided by the reset circuit 600 may be applied to the second terminal 120 (i.e., the second node N2) of the driving circuit 100 and the light emitting element 400 through the light emission control circuit 500, so that a reset operation may be performed on the light emitting element 400, the driving circuit 100, the first compensation sub-circuit 310 and the second compensation sub-circuit 320 to eliminate the influence of the previous light emission phase. For another example, during the light emission phase, the light emission control circuit 500 may be turned on in response to the light emission control signal, so that the driving current can be transmitted to the light emitting element 400 through the light emission control circuit 500, so that the light emitting element 400 emits light.

The reset circuit 600 is connected with a reset voltage terminal Vinit and the first terminal 410 (the third node N3) of the light emitting element 400, and the reset circuit 600 is configured to apply the reset voltage to the first terminal 410 of the light emitting element 400 in response to the reset signal. For example, the reset circuit 600 is respectively connected with the first terminal 410 (the third node N3) of the light emitting element 400, the reset voltage terminal Vinit and the reset control line (for example, the reset circuit 600 is connected with the reset control line via the reset control terminal Reset). For example, during the reset phase, the reset circuit 600 may be turned on in response to the reset signal, so as to apply the reset voltage to the third node N3, at which phase, the light emission control circuit 500 is turned on in response to the light emission control signal, and thus the reset operation may be performed on the first compensation sub-circuit 310, the second compensation sub-circuit 320, the driving circuit 100 and the light emitting element 400 to eliminate the influence of the previous light emission phase.

For example, the reset voltage may be provided by the independent reset voltage terminal Vinit; or the reset voltage may be provided by the first voltage terminal VSS in other embodiments, whereby accordingly, the reset circuit 600 is not connected with the reset voltage terminal Vinit but is connected with the first voltage terminal VSS, which is not limited by the embodiments of the present disclosure.

For example, in the embodiments of the present disclosure, the reset signal may be the scan signal provided by the scan line (the scan signal terminal Gate), and accordingly, the reset control terminal Reset of the reset circuit 600 may be directly connected with the scan signal terminal Gate, which does not need to add a new signal, and the circuit structure is simple and easy to implement as compared with a conventional display panel. In other embodiments, the reset signal may be provided by the independent reset control terminal Reset, and it is satisfied that the reset signal and the scan signal are synchronized, which is not limited by the embodiments of the present disclosure.

For example, in a display device, in a case where the pixel circuits 10 are arranged in an array, a scan line of the plurality of scan lines is correspondingly connected with data writing circuits 200 of pixel circuits in a row of pixel units to provide the scan signal. For example, a scan line of the plurality of scan lines is correspondingly connected with reset circuits 600 of pixel circuits in a row of pixel units so that the scan signal functions as the reset signal, in which case, the display device may not separately provide the reset control line, so as to save wiring space and to make it more easy to realize a narrow bezel.

For example, in a case where the driving circuit 100 is implemented as a driving transistor, for example, a gate electrode of the driving transistor can function as the control terminal 130 of the driving circuit 100, a first electrode (for example, a drain electrode) of the driving transistor can function as the first terminal 110 of the driving circuit 100, and a second electrode (for example, a source electrode) can function as the second terminal 120 of the driver circuit 100.

It should be noted that, in the embodiments of the present disclosure, the first voltage terminal VDD maintains to be inputted with a DC (direct-current) high level, for example, the DC high level is referred to as the first voltage, and the second voltage terminal VSS maintains to be inputted with a DC low level, for example, the DC low level is referred to as the second voltage; and the second voltage is lower than the first voltage. The following embodiments are the same as those described herein and will not be described again.

In addition, it should be noted that, in the descriptions of the embodiments of the present disclosure, the symbol Vdata may represent both the data signal terminal and the data signal. Similarly, the symbol Reset may represent both the reset control terminal and the reset signal; the symbol Vinit may represent both the reset voltage terminal and the reset voltage; the symbol VDD may represent both the first voltage terminal and the first voltage; and the symbol VSS may represent both the second voltage terminal and the second voltage. The following embodiments are the same as those described herein and will not be described again.

The pixel circuit 10 provided by any one of the embodiments of the present disclosure can compensate for the threshold voltage of the driving circuit of the pixel circuit on one hand, thereby avoiding the phenomenon of display mura of the display device. On the other hand, the defect that brightness difference caused by the different voltage drops between the end far away from the integrated circuit and the end near the integrated circuit can be solved, so that the display effect of the display panel adopting the pixel circuit can be improved.

Figure 5:
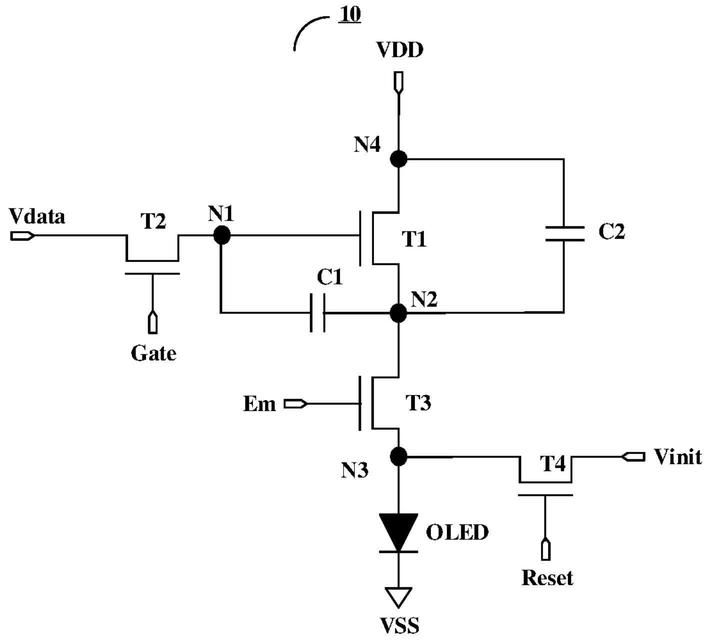
FIG. 5 is a circuit diagram showing a specific implemental example of a pixel circuit as shown in FIG. 4.

For example, the pixel circuit 10 as shown in FIG. 4 can be implemented as the pixel circuit structure as shown in FIG. 5. As shown in FIG. 5, the pixel circuit 10 includes first to fourth transistors T1, T2, T3 and T4 and includes a first storage capacitor C1, a second storage capacitor C2 and a light emitting element OLED. For example, the first transistor T1 is used as a driving transistor, and the other second to fourth transistors are used as switching transistors. For example, the light emitting element OLED may be of various types, such as top emission type, bottom emission type, or double-sided emission, etc., and may emit red light, green light, blue light or white light, etc., which is not limited by the embodiments of the present disclosure.

For example, as shown in FIG. 5, in more detail, the first compensation sub-circuit 310 may be implemented as the first storage capacitor C1. A first electrode of the first storage capacitor C1 is connected with the control terminal 130 (the first node N1) of the driving circuit 100, and a second electrode of the first storage capacitor C1 is connected with the second terminal 120 (the second node N2) of the driving circuit 100. It should be noted that the embodiments of the present disclosure are not limited thereto; alternatively, the first compensation sub-circuit 310 may be a circuit formed of other components to implement corresponding functions.

The second compensation sub-circuit 320 may be implemented as a second storage capacitor C2. A first electrode of the second storage capacitor C2 is connected with the first voltage terminal VDD and the first terminal 110 (the fourth node N4) of the driving circuit 100, and a second electrode of the second storage capacitor C2 is connected with the second terminal 120 (the second node N2) of the driving circuit 100. It should be noted that the embodiments of the present disclosure are not limited thereto; alternatively, the second compensation sub-circuit 320 may be a circuit formed of other components to implement corresponding functions.

The driving circuit 100 may be implemented as a first transistor T1. A gate electrode of the first transistor T1 functions as the control terminal 130 of the driving circuit 100 and is connected with the first node N1. A first electrode of the first transistor T1 functions as the first terminal 110 of the driving circuit 100 and is connected with the fourth node N4 to receive the first voltage. A second electrode of the first transistor T1 functions as the second terminal 120 of the driving circuit 100 and is connected with the second node 120. It should be noted that the embodiments of the present disclosure are not limited thereto; alternatively, the driving circuit 100 may be a circuit formed of other components to implement corresponding functions.

The data writing circuit 200 may be implemented as a second transistor T2. A gate electrode of the second transistor T2 is configured to be connected with the scan line (for example, the gate electrode of the second transistor T2 is connected with the scan line through the scan signal terminal Gate) to receive the scan signal, a first electrode of the second transistor T2 is configured to be connected with the data line (for example, the first electrode of the second transistor T2 is connected with the data line through the data signal terminal Vdata) to receive the data signal, and a second electrode of the second transistor T2 is configured to be connected with the control terminal 130 (i.e., the first node N1) of the driving circuit 100. It should be noted that embodiments of the present disclosure are not limited thereto; alternatively, the data writing circuit 200 may be a circuit formed of other components.

The light emitting element 400 may be implemented as an OLED. The first terminal 410 (for example, an anode) of the light emitting element OLED is connected with the third node N3 and is configured to receive the driving current. For example, in the example as shown in FIG. 4, in a case where the light emission control circuit 500 is turned on, the first terminal 410 of the light emitting element OLED can receive the driving current from the second terminal 120 of the driving circuit 100. For another example, in the example as shown in FIG. 2 and FIG. 3, the first terminal 410 of the light emitting element OLED can be configured to receive the driving circuit directly from the second terminal 120 of driving circuit 100. The second terminal 420 (for example, a cathode) of the light emitting element OLED is configured to be connected with the second voltage terminal VSS to receive the second voltage. For example, the second voltage terminal VSS may be grounded, that is, VSS may be 0V. For example, in a display panel, in a case where the pixel circuits 10 are arranged in an array, the cathodes of the light emitting elements OLED may be electrically connected with the same voltage terminal, that is, a mode of sharing the same cathode is adopted, and the following embodiments are the same and will not be described again.

The light emission control circuit 500 may be implemented as a third transistor T3. A gate electrode of the third transistor T3 is configured to be connected with the light emission control line (for example, the gate electrode of the third transistor T3 is connected with the light emission control line through the light emission control terminal Em) to receive the light emission control signal, a first electrode of the third transistor T3 is configured to be connected with the second terminal 120 (the second node N2) of the driving circuit 100, and a second electrode of the third transistor T3 is configured to be connected with the first terminal 410 (the third node N3) of the light emitting element OLED.

The reset circuit 600 may be implemented as a fourth transistor T4. A gate electrode of the fourth transistor T4 is configured to be connected with the reset control line (for example, the gate electrode of the fourth transistor T4 is connected with the reset control line through the reset control terminal Reset) to receive the reset signal, a first electrode of the fourth transistor T4 is configured to be connected with the reset voltage terminal Vinit to receive the reset voltage, and a second electrode of the fourth transistor T4 is configured to be connected with the first terminal 410 (the third node N3) of the light emitting element OLED. For example, in an embodiment of the present disclosure, the reset signal may be the scan signal provided by the scan line (the scan signal terminal Gate). In other embodiments, the reset signal may be provided by an independent reset control line, and it is satisfied that the reset signal and the scan signal are synchronized, and embodiments of the present disclosure do not limit this. For example, in this example, the reset control terminal Reset is the scan signal terminal Gate, and therefore, the gate electrode of the fourth transistor T4 is configured to be connected with the scan line to receive the scan signal and the scan signal function as the reset signal. It should be noted that the embodiments of the present disclosure are not limited thereto; alternatively, the reset circuit 600 may be a circuit formed of other components to implement corresponding functions.

In the embodiments of the present disclosure, the first node N1, the second node N2, the third node N3 and the fourth node N4 do not represent actual components, but represent junctions of related electrical connections in the circuit diagrams.

Figure 6:
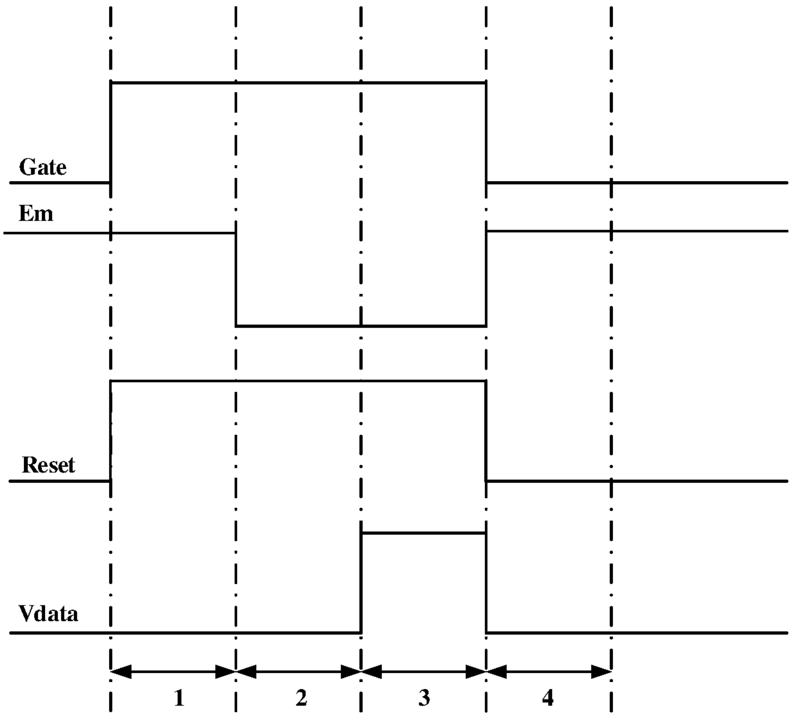
FIG. 6 is a timing diagram of a driving method of a pixel circuit according to an embodiment of the present disclosure.

FIG. 6 is a signal timing diagram of the pixel circuit according to an embodiment of the present disclosure. The operation principle of the pixel circuit 10 as shown in FIG. 5 will be described below with reference to the signal timing diagram as shown in FIG. 6. In addition, the description will be made by taking an example in which each transistor is an N-type transistor, but the embodiments of the present disclosure are not limited thereto.

As shown in FIG. 6, a display process of each frame of image includes four phases which are respectively the reset phase 1, the compensation phase 2, the data writing phase 3 and the light emission phase 4, and the timing waveform of each signal in each phase is shown in FIG. 6.

Figure 7:
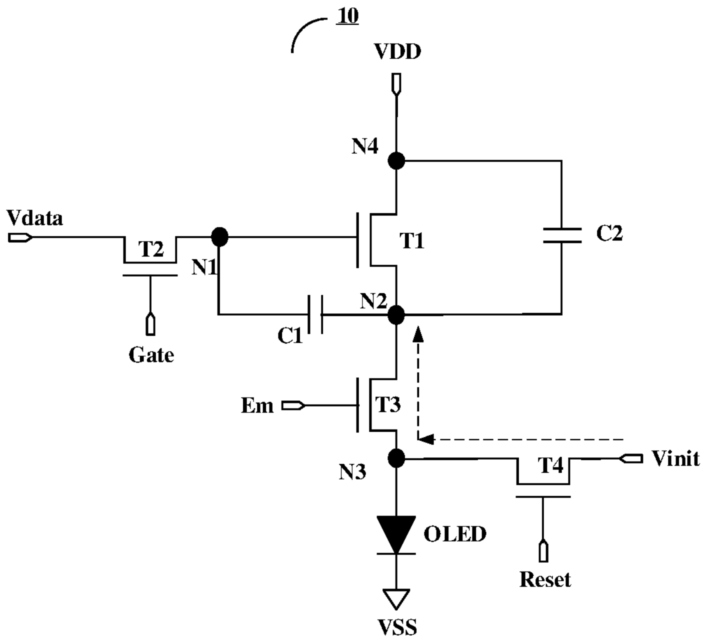
FIG. 7 to FIG. 10 are schematic circuit diagrams, respectively corresponding to four phases in FIG. 6, of the pixel circuit as shown in FIG. 5.
Figure 8:
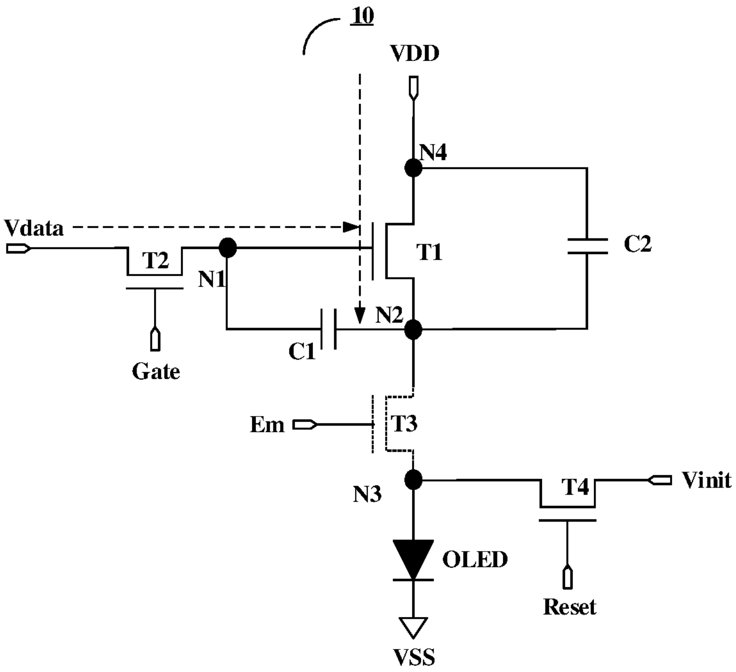
Figure 9:
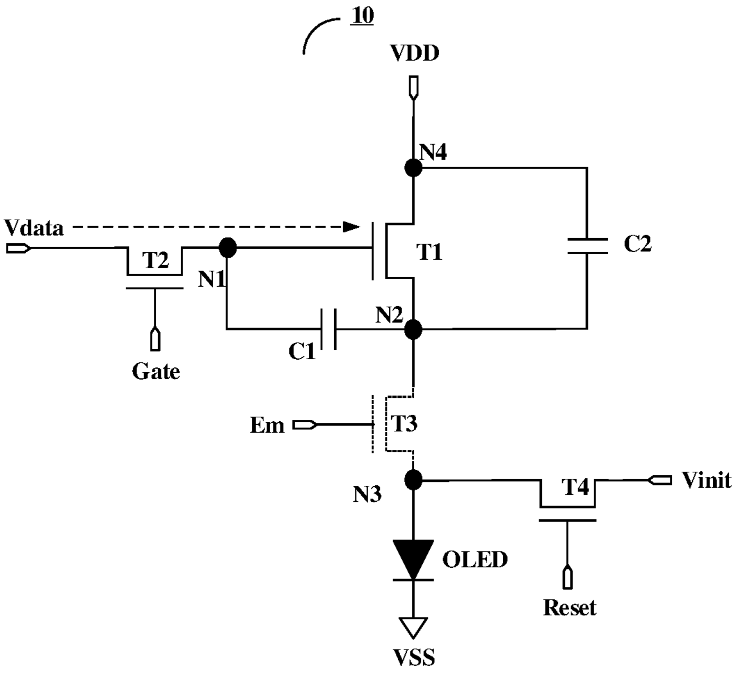
Figure 10:
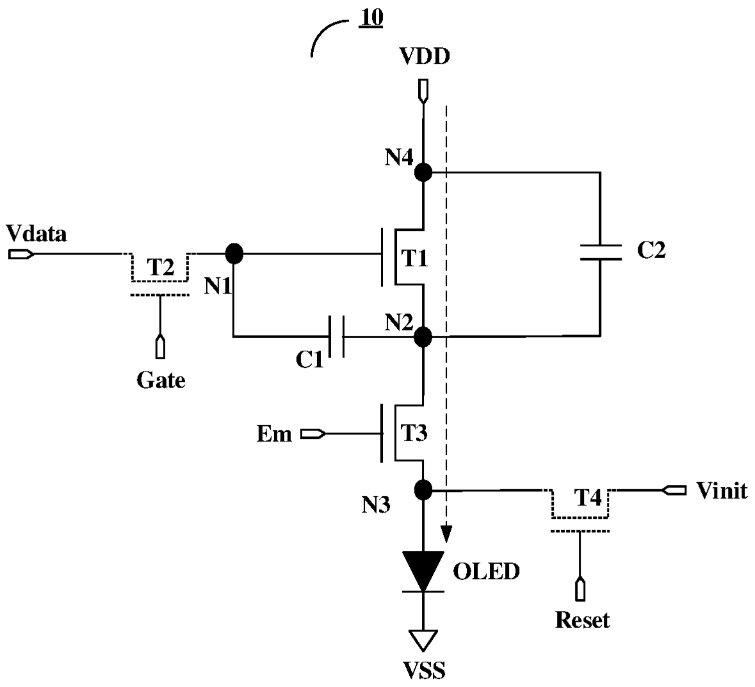

It should be noted that FIG. 7 is a schematic diagram of the pixel circuit as shown in FIG. 5 during the reset phase 1, FIG. 8 is a schematic diagram of the pixel circuit as shown in FIG. 5 during the compensation phase 2, FIG. 9 is a schematic diagram of the pixel circuit as shown in FIG. 5 during the data writing phase 3, and FIG. 10 is a schematic diagram of the pixel circuit as shown in FIG. 5 during the light emission phase 4. In addition, the transistors in FIG. 7 to FIG. 10 indicated with dashed lines are meant to be in a turned-off state during the corresponding stages, and dashed lines with an arrow in FIG. 7 to FIG. 10 indicate a current direction of the pixel circuit during the corresponding stages. Transistors in FIG. 7 to FIG. 10 are described in an example of n-type transistor, that is, each transistor is turned on in a case that a gate electrode is input with a high level and is turned off in a case that a gate electrode is input with a low level. The following embodiments are the same as those described herein and will not be described again.

During the reset phase 1, the reset signal, the scan signal and the light emission control signal are inputted, the reset circuit 600, the data writing circuit 200 and the light emission control circuit 500 are turned on, and the first compensation sub-circuit 310, the second compensation sub-circuit 320, the driving circuit 100 and the light emitting element 400 are reset.

For example, in an embodiment of the present disclosure, the reset signal may be the scan signal provided by the scan line (for example, connection is realized through the scan signal terminal Gate), and therefore, during the reset phase 1, only the scan signal and the light emission control signal need to be inputted. In other embodiments, the reset signal may be provided by an independent reset control terminal Reset, which satisfies that the reset signal and the scan signal are synchronized, and this is not limited by the embodiments of the present disclosure. The following embodiments are the same as those described herein and will not be described again.

As shown in FIG. 6 and FIG. 7, during the reset phase 1, the fourth transistor T4 is turned on by a high level of the reset signal (the scan signal), and the second transistor T2 is turned on by a high level of the scan signal. At the same time, the third transistor T3 is turned on by a high level of the light emission control signal.

As shown in FIG. 7, during the reset phase 1, a reset path is formed (as indicated by the dashed line with an arrow in FIG. 7). During this phase, the light emitting element OLED is discharged through the fourth transistor T4, and because the third transistor T3 is turned on by the high level of the light emission control signal, the first storage capacitor C1 and the second storage capacitor C2 are discharged through the third transistor T3 and the fourth transistor T4, so as to reset the second node N2 and the third node N3, so that levels of the second node N2 and the third node N3 are the reset voltage Vinit after the reset phase 1; for example, the reset voltage Vinit is about −3V. During this phase, the data signal terminal Vdata is inputted with the low level of the data signal, that is, a reference voltage Vref, so that the level of the first node N1 after the reset phase 1 is the reference voltage Vref which has a level of, for example, about 3V, and at this time, the gate electrode of the first transistor T1 is turned on due to the applied reference voltage. For example, in a display device, in a case where the pixel circuits 10 are arranged in an array, the gate electrodes of the second transistors T2 of the Nth (N is an integer greater than zero) row of pixel circuits are connected with the scan line of the Nth row to receive the scan signal, and the gate electrodes of the fourth transistors T4 of the Nth row of pixel circuits are connected with the scan line of the Nth row to receive the scan signal of the Nth row as the reset signal. Compared with a conventional display panel, this manner can save signal lines, has a simple circuit structure and is easy to realize the narrow bezel.

During the reset phase 1, the second node N2 is reset, so that the first storage capacitor C1 and the second storage capacitor C2 are reset, thus the electric charges stored in the first storage capacitor C1 is discharged, so that the data signal in the subsequent phase can be stored more quickly and reliably in the first storage capacitor C1; the electric charges stored in the second storage capacitor C2 is also discharged, so that the second storage capacitor C2 can better play the role of adjusting, by coupling, in subsequent data writing phase, for example; at the same time, the third node N3 is also reset, that is, the light emitting element OLED is reset, so that the light emitting element OLED displays a black state and does not emit light before the light emission phase 4, and thus the display effect such as the contrast ratio of the display device adopting the pixel circuit can be improved.

During the compensation phase 2, the scan signal is inputted, the data writing circuit 200 and the driving circuit 100 are turned on, and the first compensation sub-circuit 310 compensates the driving circuit 100.

As shown in FIG. 6 and FIG. 8, during the compensation phase 2, the second transistor T2 is turned on by the high level of the scan signal. Because the second transistor T2 is turned on, the data signal terminal Vdata outputs the low level of the data signal, namely the reference voltage Vref, to the first node N1, and thus the first transistor T1 is turned on by the level of the reference voltage Vref. At the same time, the third transistor T3 is turned off by the low level of the light emission control signal, and the fourth transistor T4 is turned on by the high level of the reset signal (i.e., the scan signal), thereby ensuring that the light emitting element OLED does not emit light at this phase.

As shown in FIG. 8, during the compensation phase 2, a compensation path is formed (shown by the dashed lines with an arrow in FIG. 8), and the first voltage provided by the first voltage terminal VDD charges the second node N2 through the first transistor T1 (i.e., the first voltage charges the first storage capacitor C1). It is easily understood that during this phase, the level of the first node N1 is maintained as the reference voltage Vref, and according to the characteristics of the first transistor T1 itself, in a case where the level of the second node N2 is charged to Vref-Vth, the first transistor T1 is turned off, and the charging process is over. It should be noted that Vth represents a threshold voltage of the first transistor T1. Because the first transistor T1 is described as an N-type transistor in the present embodiment, the threshold voltage Vth is a positive value here.

In the example as shown in FIG. 3, for example, the pixel circuit 10 does not include the light emission control circuit 500 and the reset circuit 600, and in this example, the reference voltage Vref is determined according to the threshold voltage Vth of the first transistor T1, such that the first transistor T1 is has a short turn-on time and a small flowing current in the compensation phase 2, thereby avoiding causing the light emitting element OLED to emit light.

After the compensation phase 2, the level of the first node N1 is maintained as the reference voltage Vref, the llevel of the third node N3 is maintained as the reset voltage Vinit, and the level of the second node N2 is changed to Vref-Vth, that is, voltage information of the threshold voltage Vth is stored in the first storage capacitor C1 for compensation of the threshold voltage of the first transistor T1 itself during the subsequent light emission phase.

During the data writing phase 3, the scan signal and the data signal are inputted, the data writing circuit 200 is turned on, the data writing circuit 200 writes the data signal to the first compensation sub-circuit 310, and the second compensation sub-circuit 320 adjusts, by coupling, the voltage of the second terminal 120 (the second node N2) of the driving circuit 100 based on the voltage variation value at the control terminal 130 (the first node N1) of the driving circuit 100.

As shown in FIG. 6 and FIG. 9, during the data writing phase 3, the second transistor T2 is turned on by the high level of the scan signal; meanwhile, the fourth transistor T4 is turned on by the high level of the reset signal (the scan signal), and the third transistor T3 is turned off by the low level of the light emission control signal.

As shown in FIG. 9, during the data writing phase 3, a data writing path is formed (as indicated by a dashed line with an arrow in FIG. 9), and the data signal Vdata charges the first node N1 through the second transistor T2 (i.e., the data signal Vdata charges the first storage capacitor C1), so that the level of the first node N1 is changed from the reference voltage Vref to the level Vdata of the data signal. Due to the characteristics of the capacitor itself (for example, the characteristic that the voltage difference between the two electrodes of the capacitor cannot be suddenly changed), the change in a level of one electrode, namely the first node N1, of the first storage capacitor C1 causes the change of a level of the other electrode, namely the second node N2, of the first storage capacitor C1; meanwhile, based on the fact that the first storage capacitor C1 and the second storage capacitor C2 are connected in series, the level of one electrode, namely the fourth node N4, of the second storage capacitor C2 remains unchanged, and according to the principle of conservation of charge, it is obtained that the level of the second node N2 can be changed to Vref−Vth+(Vdata−Vref)C1/(C1+C2).

After the data writing phase 3, the level of the first node N1 becomes the level Vdata of the data signal, the level of the third node N3 remains as the reset voltage Vinit, and the level of the second node N2 becomes Vref−Vth+(Vdata−Vref)C1/(C1+C2); that is to say, the voltage information with the data signal Vdata is stored in the first storage capacitor C1 for display of different gray levels based on different data signals in subsequent light emission phase.

During the light emission phase 4, the light emission control signal is inputted, the light emission control circuit 500 and the driving circuit 100 are turned on, the first compensation sub-circuit 310 adjusts, by coupling, the voltage of the control terminal 130 (the first node N1) of the driving circuit 100 according to the voltage variation value at the second terminal 120 (the second node N2) of the driving circuit 100, and the light emission control circuit 500 applies the driving current to the light emitting element OLED to allow the light emitting element OLED to emit light.

As shown in FIG. 6 and FIG. 10, during the light emission phase 4, the third transistor T3 is turned on by the high level of the light emission control signal, and the first transistor T1 continues to be turned on due to the level of the first node N1 during the previous phase; at the same time, the second transistor T2 is turned off by the low level of the scan signal, and the fourth transistor T4 is turned off by the low level of the reset signal (the scan signal).

As shown in FIG. 10, during the light emission phase 4, a driving light-emitting path is formed (as indicated by a dashed line with an arrow in FIG. 10). The light emitting element OLED can emit light under action of the driving current flowing through the first transistor T1. During the light emission phase 4, the level of the third node N3 is $V_{OLED}$+VSS, and because the third transistor T3 is turned on by the high level of the light emission control signal, the level of the second node N2 is changed from VrefVth−(Vdata−Vref)C1/(C1+C2) to an level which is equal to the level of the third node N3. As can be seen from above, in a case where the level of one electrode of the capacitor changes, the other electrode of the capacitor also changes accordingly. Therefore, during this phase, the level of the first node N1 becomes $V_{OLED}$+VSS−(Vdata−Vref)C1/(C1+C2)−Vref+Vth+Vdata.

Specifically, the value of the driving current $I_{OLED}$ flowing through the light emitting element OLED can be obtained according to the following formula:

$$I_{OLED}=\frac{1}{2}*K*(Vgs-Vth)^2;$$

the following values:

$$Vg=V_{N1}=V_{OLED}+VSS-(V\text{data}-V\text{ref})C1/(C1+C2)-V\text{ref}+Vth+V\text{data},$$

$$V_S=V_{N2}=V_{OLED}+VSS$$

are substituted into the above formula, and it can be obtained:

$$I_{OLED}=\frac{1}{2}*K*((V\text{data}-V\text{ref})C2/(C1+C2))^2.$$

In the above formulas, Vth represents the threshold voltage of the first transistor T1, Vgs represents the voltage between the gate electrode of the first transistor T1 and the second electrode (for example, the source electrode) of the first transistor T1, Vg represents the level of the gate electrode of the first transistor T1, Vs represents the level of the second electrode (for example, the source electrode) of the first transistor T1, $V_{N1}$ represents the level of the first node N1, $V_{N2}$ represents the level of the second node N2, and K is a constant value.

It can be seen from the above formula that, on the one hand, the driving current IDLED flowing through the light emitting element OLED is no longer related to the threshold voltage Vth of the first transistor T1, thereby it can be realized that the pixel circuit is compensated, a threshold voltage drift defect of the driving transistor (the first transistor T1 in the embodiments of the present disclosure) caused by process and long-time operation is solved, and the influence of the threshold voltage on the driving current IDLED is eliminated, thereby avoiding the phenomenon of display mura and improving display effect. On the one hand, the driving current IDLED flowing through the light emitting element OLED is no longer related to the first voltage VDD, and thus the defect that different voltage drops of the first voltage VDD between the end far away from the integrated circuit and the end near the integrated circuit causes the brightness difference is solved, so that the display effect of the display device adopting the pixel circuit can be improved.

It should be noted that, in the embodiments of the present disclosure, charging a node (for example, the first node N1, the second node N2, etc.) indicates charging a capacitor electrically connected with the node. Similarly, discharging the node means discharging the capacitor electrically connected with the node.

It should be noted that the previous level of the third node N3 is the reset voltage Vinit, the level of the third node N3 becomes Voled+Vss when the light is emitted, so that the level of the third node N3 has a variation of Voled+Vss−Vinit during the light emission phase 4. When the third transistor T3 is turned on, because the second node N2 is connected with the third node N3, the change in the level of the third node N3 affects the change in the level of the second node N2, thereby affecting the value of Vgs−Vth. Such phenomenon can be avoided by increasing the capacitance value of the second storage capacitor C2, so that the capacitance value of the second storage capacitor C2 is far greater than the capacitance value of the parasitic capacitance of the light emitting element OLED, and thus the display defect caused by the change in the level of the third node N3 can be avoided to some extent.

It should be noted that transistors adopted in the embodiments of the present disclosure all may be thin film transistors, field-effect transistors or other switching devices with same characteristics and thin film transistors are taken as an example to illustrated in the embodiments of the present disclosure. Source electrodes and drain electrodes of the transistors adopted herein may be symmetric in structure, so the source electrodes and drain electrodes are not different structurally. In the embodiments of the present disclosure, in order to distinguish the two electrodes apart from the gate electrode, one electrode is described as a first electrode and the other electrode is described as a second electrode.

Figure 11:
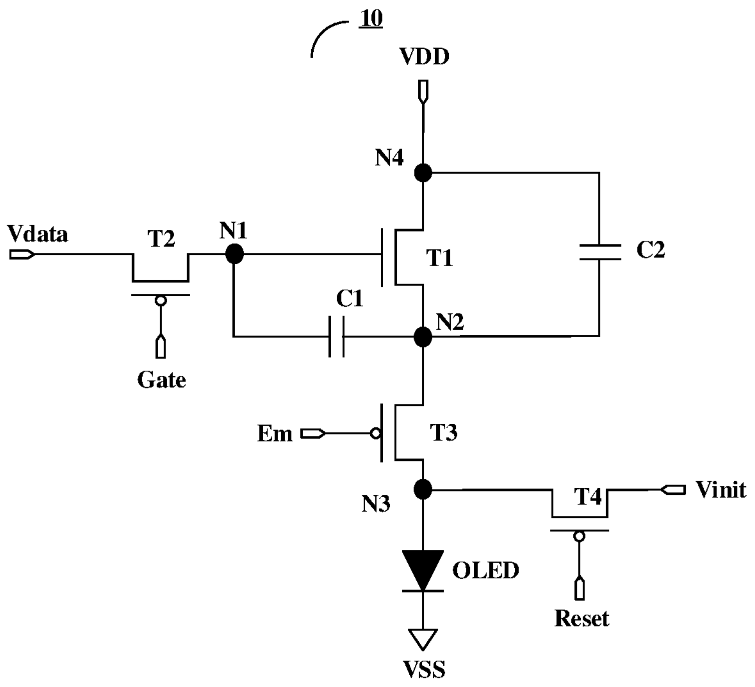
FIG. 11 is a circuit diagram of a pixel circuit according to an embodiment of the present disclosure.

In addition, it should be noted that the transistors in the pixel circuit 10 as shown in FIG. 5 are all described by taking the case that the transistors are the N-type transistors as an example. In this case, the first electrode may be the drain electrode and the second electrode may be the source electrode. Embodiments of the present disclosure include, but are not limited to, the arrangement manner of FIG. 5; for example, as shown in FIG. 11, in another embodiment of the present disclosure, transistors in pixel circuit 10 may also adopt a hybrid of p-type transistors and n-type transistors, and it is only needed to connect the terminal of the transistor in the selected type with a polarity according to a terminal polarity of the corresponding transistor in the embodiments of the present disclosure. For example, as shown in FIG. 11, the first transistor T1 adopts an N-type transistor, and the second transistor T2, the third transistor T3 and the fourth transistor T4 adopt a P-type transistor. It should be noted that the levels of the signals provided to the second transistor T2, the third transistor T3 and the fourth transistor T4 need to be changed accordingly, for example, the level is changed from a high level to a low level or from a low level to a high level.

It should be noted that in a case where the N-type transistor is adopted, indium gallium zinc oxide (IGZO) may be asopted as an active layer of the thin film transistor; compared with the manner of adopting low temperature polysilicon (LTPS) or amorphous silicon (for example, hydrogenated amorphous silicon) as the active layer of the thin film transistor, the size of the transistor can be effectively reduced and the generation of leakage current can be avoided.

At least one embodiment of the present disclosure further provides a display panel including a plurality of pixel units arranged in an array, and each of the plurality of pixel units includes the pixel circuit provided by any one of the embodiments of the present disclosure.

Figure 12:
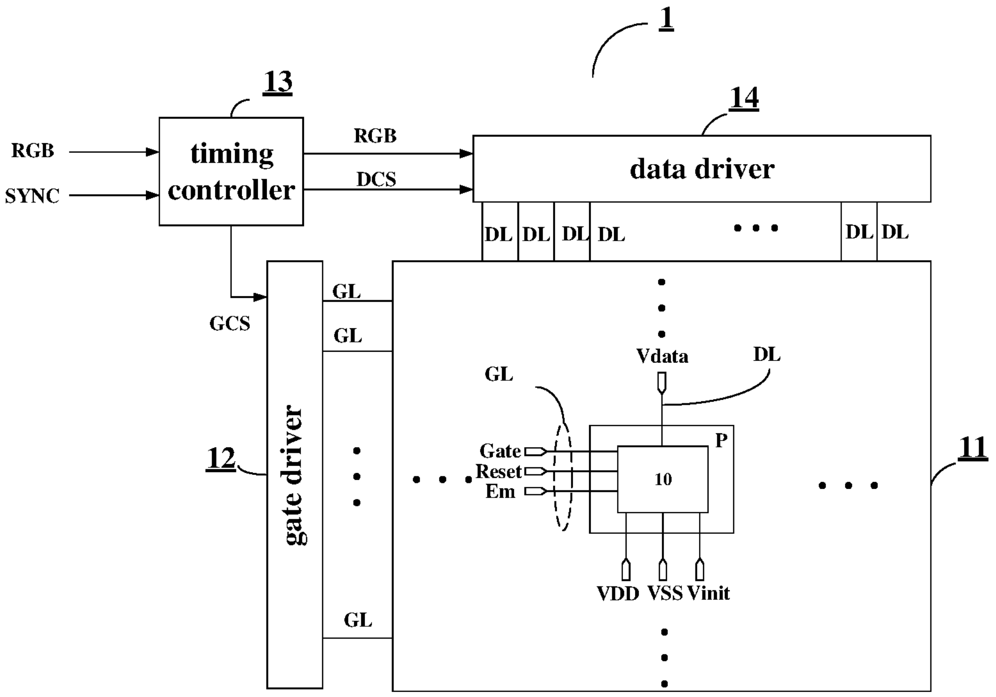
FIG. 12 is a schematic diagram of a display panel according to an embodiment of the present disclosure.

FIG. 12 is a schematic block diagram of the display panel according to an embodiment of the present disclosure. As shown in FIG. 12, the display panel 11 is disposed in a display device 1 and is electrically connected with a gate driver 12, a timing controller 13 and a data driver 14. The display panel 11 includes pixel units P defined by intersections of a plurality of scan lines GL and a plurality of data lines DL. The gate driver 12 is configured for driving the plurality of scan lines GL. The data driver 14 is configured for driving the plurality of data lines DL. The timing controller 13 is configured for processing image data RGB inputted from the outside of the display device 1, supplying the processed image data RGB to the data driver 14, and outputting scan control signal GCS to the gate driver 12, and to output data control signal DCS to the data driver 14, so as to control the gate driver 12 and the data driver 14.

For example, the display panel 11 includes the plurality of pixel units P including any one of the pixel circuits 10 provided in the embodiments of the present disclosure. For example, the pixel circuit 10 as shown in FIG. 5 is included. As shown in FIG. 12, the display panel 11 further includes the plurality of scan lines GL and the plurality of data lines DL. For example, a scan line of the plurality of scan lines GL is correspondingly connected with data writing circuits 200 of pixel circuits 10 in a row of pixel units P to provide the scan signal, and a scan line of the plurality of scan lines GL is further correspondingly connected with reset circuits 600 of the pixel circuits 10 in the row of pixel units P to provide the reset signal, scan signal functions as the reset signal.

For example, the pixel unit P is disposed in an intersection region of the scan line GL and the data line DL. For example, as shown in FIG. 12, each pixel unit P is connected with three scan lines GL (which provide the scan signal, the reset signal and the light emission control signal, respectively), a data line DL, a first voltage line for providing the first voltage, a second voltage line for providing the second voltage and a reset voltage line for providing the reset voltage. For example, the first voltage line or the second voltage line may be replaced with a corresponding plate-like common electrode (for example, a common anode or a common cathode). It should be noted that only a part of the pixel units P, the scan lines GL and the data lines DL are shown in FIG. 12. It should be noted that in the embodiments of the present disclosure, because the scan signal provided by the scan line may also be used as the reset signal, each pixel unit P may be connected with only two scan lines GL, that is, one scan line GL is used to provide the scan signal and the reset signal, and the other scan line GL is used to provide the light emission control signal. The following embodiments are the same as those described herein and will not be described again.

For example, the plurality of pixel units P are arranged in a plurality of rows, both the data writing circuits 200 and the reset circuits 600 in the pixel circuits of each row of the pixel units P are connected with a same scan line GL, and the light emission control circuits 500 in the pixel circuits of each row of pixel units P are connected with another scan line GL to receive the light emission control signal. For example, the data line DL of each column is connected with the data writing circuits 200 in the each column of pixel circuits 10 to provide the data signal.

For example, the gate driver 12 provides a plurality of strobe signals to the plurality of scan lines GL according to the plurality of scan control signals GCS from the timing controller 13. The plurality of strobe signals include the scan signal, the light emission control signal and the reset signal. These strobe signals are provided to each of the pixel units P through the plurality of scan lines GL.

For example, the data driver 14 converts the digital image data RGB from the timing controller 13 to the data signal Vdata according to a plurality of data control signals DCS from the timing controller 13 using a reference Gamma voltage. The data driver 14 provides the converted data signals Vdata to the plurality of data signal lines DL.

For example, the timing controller 13 processes the image data RGB input from outside so as to enable it to match with the size and the resolution of the display panel 11, and then provides the processed image data to the data driver 14. The timing controller 13 uses a synchronization signal (e.g., a dot clock DCLK, a data enable signal DE, a horizontal synchronizing signal Hsync and a vertical synchronizing signal Vsync) input from outside the display device to generate the plurality of scan control signals GCS and the plurality of data control signals DCS. The timing controller 13 respectively provide the generated scan control signals GCS and data control signals DCS to the gate driver 12 and the data driver 14 for controlling the gate driver 12 and the data driver 14.

For example, the data driver 14 may be connected with the plurality of data lines DL so as to provide the data signal Vdata, and may also be connected with the plurality of first voltage lines, the plurality of second voltage lines and the plurality of reset voltage lines to respectively provide the first voltage, the second voltage and the reset voltage.

For example, the gate driver 12 and the data driver 14 may be implemented as a semiconductor chip. The display device 1 may include other components, such as a signal decode circuit, a voltage conversion circuit and the like. These components may adopt the known conventional components, which is not described in detail.

For example, the display panel 11 provided in this embodiment may be applied to any product or component having a display function, such as an electronic paper, a mobile phone, a tablet computer, a television, a display, a notebook computer, a digital photo frame, a navigator, and the like.

Regarding the technical effects of the display panel 11, reference may be made to the technical effects of the pixel circuit 10 provided in the embodiments of the present disclosure, and details are not described herein again.

Embodiments of the present disclosure further provide a driving method that may be used to drive the pixel circuit 10 provided by the embodiments of the present disclosure. For example, in the example as shown in FIG. 2, the driving method includes the following operations.

During the compensation phase, the scan signal is inputted, the data writing circuit 200 and the driving circuit 100 are turned on, and the compensation circuit 300 compensates the driving circuit 100.

During the data writing phase, the scan signal and the data signal are inputted, the data writing circuit 200 is turned on, the data writing circuit 200 writes the data signal to the compensation circuit 300, and the compensation circuit 300 adjusts, by coupling, the voltage of the second terminal 120 of the driving circuit 100 according to the voltage variation value at the control terminal 130 of the driving circuit 100.

For example, in the example as shown in FIG. 3, in the case where the compensation circuit 300 includes the first compensation sub-circuit 310 and the second compensation sub-circuit 320, the driving method includes the following operations.

During the compensation phase, the scan signal is inputted, the data writing circuit 200 and the driving circuit 100 are turned on, and the first compensation sub-circuit 310 compensates the driving circuit 100.

During the data writing phase, the scan signal and the data signal are inputted, the data writing circuit 200 is turned on, the data writing circuit 200 writes the data signal to the first compensation sub-circuit 310, and the second compensation sub-circuit 320 adjusts, by coupling, the voltage of the second terminal 120 of driving circuit 100 according to the voltage variation value at the control terminal 130 of the driving circuit 100.

For example, in the example as shown in FIG. 4 or FIG. 5, the driving method includes the following operations.

For example, in a case where the pixel circuit 10 further includes the light emission control circuit 500, the driving method further includes the light emission phase. During the light emission phase, the light emission control signal is inputted, the light emission control circuit 500 and the driving circuit 100 are turned on, the first compensation sub-circuit 310 adjusts, by coupling, the voltage of the control terminal 130 of the driving circuit 100 according to the voltage variation value at the second terminal 120 of the driving circuit 100, and the light emission control circuit 500 applies the driving current to the light emitting element OLED to allow the light emitting element OLED to emit light.

For example, in a case where the pixel circuit 10 further includes the reset circuit 600, the driving method further includes the reset phase. During the reset phase, the reset signal, the scan signal and the light emission control signal are inputted, the reset circuit 600, the data writing circuit 200 and the light emission control circuit 500 are turned on, and the first compensation sub-circuit 310, the second compensation sub-circuit 320 and the light emitting element OLED are reset; for example, the reset signal is synchronized with the scan signal; and for another example, the scan signal may be used as the reset signal.

The driving method provided by any one of the embodiments of the present disclosure, on the one hand, can compensate for the threshold voltage of the driving circuit of the pixel circuit, thereby avoiding the phenomenon of display mura of the display device; on the other hand, the defect that brightness difference caused by the different voltage drops between the end far away from the integrated circuit and the end near the integrated circuit can be solved, so that the display effect of the display device adopting the pixel circuit can be improved.

What have been described above are only specific implementations of the present disclosure, the protection scope of the present disclosure is not limited thereto. The protection scope of the present disclosure should be based on the protection scope of the claims.

What is claimed is:

1. A pixel circuit, comprising a data writing circuit, a driving circuit, a reset circuit, a light emission control circuit, and a compensation circuit, wherein the driving circuit comprises a control terminal, a first terminal and a second terminal, and the driving circuit is configured to control a driving current, which flows through the first terminal and the second terminal and is used to drive a light emitting element to emit light;

the data writing circuit is connected with the control terminal of the driving circuit, and is configured to write a data signal to the control terminal of the driving circuit in response to a scan signal; and the compensation circuit is connected with the control terminal of the driving circuit, the first terminal of the driving circuit, the second terminal of the driving circuit and a first voltage terminal, and the compensation circuit is configured to store the data signal written by the data writing circuit, to compensate the driving circuit, and to adjust, by coupling, a voltage of the second terminal of the driving circuit;

the reset circuit is connected with a reset voltage terminal and a first terminal of the light emitting element, and the reset circuit is configured to apply a reset voltage to the first terminal of the light emitting element in response to a reset signal; and the reset signal is synchronized with the scan signal;

the reset circuit comprises a fourth transistor;

a gate electrode of the fourth transistor is configured to be connected with a scan line to receive the scan signal which functions as the reset signal, a first electrode of the fourth transistor is configured to be connected with the reset voltage terminal to receive the reset voltage, and a second electrode of the fourth transistor is configured to be connected with the first terminal of the light emitting element; and the compensation circuit comprises a first compensation sub-circuit and a second compensation sub-circuit, the first compensation sub-circuit comprises a first storage capacitor, the second compensation sub-circuit comprises a second storage capacitor, and the driving current is related to a capacitance value of the first storage capacitor and a capacitance value of the second storage capacitor, wherein a value of the driving current IDLED is equal to ½*K*((Vdata−Vref)C2/(C1+C2))2, where K is a constant value, Vdata indicates the data signal, Vref indicates a reference voltage, C1 indicates the capacitance value of the first storage capacitor, and C2 indicates the capacitance value of the second storage capacitor, and wherein the data writing circuit and the reset circuit are configured to be turned on during a whole data writing phase, wherein the light emission control circuit is connected with the second terminal of the driving circuit and the first terminal of the light emitting element, and the light emission control circuit is configured to apply the driving current to the light emitting element in response to a light emission control signal, and wherein the reset circuit is configured to apply the reset voltage to the second terminal of the driving circuit and the light emitting element through the light emission control circuit during a reset phase, so that the light emitting element, the first storage capacitor, and the second storage capacitor are discharged, and the driving circuit is turned on.

2. The pixel circuit according to claim 1, wherein the first compensation sub-circuit is connected with the control terminal of the driving circuit and the second terminal of the driving circuit, and the first compensation sub-circuit is configured to store the data signal written by the data writing circuit and to compensate the driving circuit; and the second compensation sub-circuit is connected with the first voltage terminal, the first terminal of the driving circuit and the second terminal of the driving circuit, and the second compensation sub-circuit is configured to adjust, by coupling, the voltage of the second terminal of the driving circuit according to a voltage variation value at the control terminal of the driving circuit.

3. The pixel circuit according to claim 2, wherein the first compensation sub-circuit is further configured to adjust, by coupling, a voltage of the control terminal of the driving circuit according to a voltage variation value at the second terminal of the driving circuit.

4. The pixel circuit according to claim 3, wherein the first compensation sub-circuit comprises a first storage capacitor, a first electrode of the first storage capacitor is connected with the control terminal of the driving circuit, and a second electrode of the first storage capacitor is connected with the second terminal of the driving circuit.

5. The pixel circuit according to claim 2, wherein a first electrode of the first storage capacitor is connected with the control terminal of the driving circuit, and a second electrode of the first storage capacitor is connected with the second terminal of the driving circuit.

6. The pixel circuit according to claim 2, wherein a first electrode of the second storage capacitor is connected with the first voltage terminal and the first terminal of the driving circuit, and a second electrode of the second storage capacitor is connected with the second terminal of the driving circuit.

7. A driving method of the pixel circuit according to claim 2, comprising during a compensation phase, inputting the scan signal, turning on the data writing circuit and the driving circuit, and compensating the driving circuit by the first compensation sub-circuit; and during the data writing phase, inputting the scan signal and the data signal, turning on the data writing circuit, writing the data signal to the first compensation sub-circuit by the data writing circuit, and adjusting by the second compensation sub-circuit, by coupling, the voltage of the second terminal of the driving circuit according to a voltage variation value at the control terminal of the driving circuit; and during the reset phase, applying the reset voltage to the second terminal of the driving circuit and the light emitting element through the light emission control circuit, so that the light emitting element, the first storage capacitor and the second storage capacitor are discharged, and the driving circuit is turned on.

8. The driving method of the pixel circuit according to claim 7, wherein the light emitting element comprises a second terminal, the first terminal of the light emitting element is configured to receive the driving current, and the second terminal of the light emitting element is connected with a second voltage terminal;

wherein the driving method further comprises during a light emission phase, inputting the light emission control signal, turning on the light emission control circuit and the driving circuit, adjusting by the first compensation sub-circuit, by coupling, the voltage of the control terminal of the driving circuit according to a voltage variation value at the second terminal of the driving circuit, and applying the driving current to the light emitting element by the light emission control circuit to cause the light emitting element to emit light.

9. The pixel circuit according to claim 1, wherein the driving circuit comprises a first transistor;

a gate electrode of the first transistor functions as the control terminal of the driving circuit, a first electrode of the first transistor functions as the first terminal of the driving circuit and is configured to be connected with the first voltage terminal to receive a first voltage, and a second electrode of the first transistor functions as the second terminal of the driving circuit.

10. The pixel circuit according to claim 1, wherein the data writing circuit comprises a second transistor;

a gate electrode of the second transistor is configured to be connected with a scan line to receive the scan signal, a first electrode of the second transistor is configured to be connected with a data line to receive the data signal, and the second electrode of the second transistor is configured to be connected with the control terminal of the driving circuit.

11. A display panel, comprising a plurality of pixel units arranged in an array, wherein at least one of the plurality of pixel units comprises the pixel circuit according to claim 1.

12. The display panel according to claim 11, further comprising a plurality of scan lines, wherein a scan line of the plurality of scan lines is correspondingly connected with data writing circuits of pixel circuits in a row of pixel units to provide the scan signal.

13. The display panel according to claim 12, wherein in a case where the pixel circuit comprises a reset circuit, the scan line of the plurality of scan lines is further correspondingly connected with reset circuits of the pixel circuits in the row of pixel units to provide the scan signal, and the scan signal functions as the reset signal.

14. A driving method of the pixel circuit according to claim 1, comprising during a compensation phase, inputting the scan signal, turning on the data writing circuit and the driving circuit, and compensating the driving circuit by the compensation circuit; and during the data writing phase, inputting the scan signal and the data signal, turning on the data writing circuit, writing the data signal to the compensation circuit by the data writing circuit, and adjusting by the compensation circuit, by coupling, the voltage of the second terminal of the driving circuit according to a voltage variation value at the control terminal of the driving circuit; and during the reset phase, applying the reset voltage to the second terminal of the driving circuit and the light emitting element through the light emission control circuit, so that the light emitting element, the first storage capacitor and the second storage capacitor are discharged, and the driving circuit is turned on.

15. The pixel circuit according to claim 1, wherein the light emitting element further comprises a first terminal and a second terminal, the first terminal of the light emitting element is configured to receive the driving current, and the second terminal of the light emitting element is connected with a second voltage terminal.

16. The pixel circuit according to claim 15, wherein the light emission control circuit comprises a third transistor;

a gate electrode of the third transistor is configured to be connected with a light emission control line to receive the light emission control signal, a first electrode of the third transistor is configured to be connected with the second terminal of the driving circuit, and a second electrode of the third transistor is configured to be connected with the first terminal of the light emitting element.

* * * * *